UNITED STATES PATENT OFFICE.

WILLIAM CHADWICK, THOMAS CHADWICK, AND JAMES CHADWICK, OF MANCHESTER, AND JOSIAH W. KYNASTON, OF LIVERPOOL, COUNTY OF LANCASTER, ENGLAND.

PURIFYING SULPHATE OF ALUMINA.

SPECIFICATION forming part of Letters Patent No. 237,816, dated February 15, 1881.

Application filed June 2, 1880. (No specimens.) Patented in England October 9, 1879.

*To all whom it may concern:*

Be it known that we, WILLIAM CHADWICK, THOMAS CHADWICK, and JAMES CHADWICK, all of Manchester, and JOSIAH WICKLIFFE KYNASTON, of Liverpool, both places being in the county of Lancaster, in the Kingdom of England, have invented a new and useful Process for Making and Purifying Sulphate of Alumina or Alum, of which the following is a specification.

In purifying alum and aluminous solutions from iron by means of ferro-cyanides, a failure to make a commercial success has always resulted from the following causes: First, as no cheap method was known of separating the great bulk of the iron salt first, a very large amount of the expensive ferro-cyanide salt was necessary; second, the potash of the ferro-cyanide of potassium—the salt usually employed—remained behind in the solution, and was, for the purposes of mordanting, practically wasted; third, no matter how long a time was left for the resulting Prussian blue to settle, a notable quantity still remained in the solution, coloring the resulting sulphate of alumina or alum a deep blue, fatal to its employment in most of the processes for which alum or alum-cake is used.

Now, our invention is a process of purifying alum or aluminous solutions wherein a ferrocyanide is used to precipitate the iron after it has been largely purified, or while it is being purified by our arsenic process.

It consists in using ferro-cyanide of calcium in place of ferro-cyanide of potassium, and in throwing down the blue tinge by forming another and heavier precipitate in the liquid, which precipitate mechanically brings down the ferro-cyanide of iron with it.

To a solution of sulphate of alumina contaminated with a small amount of iron sulphate and arsenious acid, obtained as described in Letters Patent granted to us under date of July 20, 1880, No. 230,106, or by any other preferred process, we add a solution of ferro-cyanide of calcium exactly in sufficient quantity to precipitate the whole of the iron. We allow the mixture to stand at rest for two or three days, when the blue precipitate settles perfectly down, leaving a clear bright-blue solution. We now complete the arsenic process by precipitating the arsenic with a sulphide, preferably sulphureted hydrogen. The arsenic, precipitating, carries the blue color down with it, and frequently no other precipitant is required. When, however, there is not sufficient arsenic in the solution to form a precipitate, and in cases where arsenic is not employed, we add a small quantity, a little at a time, of sulphate of copper or sulphate of zinc. These have no chemical action on the ferro-cyanide of iron, as iron will actually take ferro-cyanic acid from copper when finely-suspended ferro-cyanide of copper is shaken up in a liquid containing soluble salts of iron. Yet the action of sulphate of copper is equally effective when there is free soluble iron in the liquid. We boil the mixture well with steam and allow it to deposit the insoluble matter, and then draw off the clear solution. We thus again obtain the ferro-cyanide of calcium required for the precipitation of iron, as before described.

It will be seen at once that the action of sulphide of arsenic, and still more that of the sulphate of copper or zinc, on the ferro-cyanide of iron is mechanical rather than chemical. In the one case the sulphide of arsenic in precipitating envelops the particles of ferro-cyanide of iron and carries them down; in the other the sulphate of copper appears to cause a molecular change in the ferro-cyanide. This action is not confined to sulphate of copper and sulphate of zinc. Other salts will do it to some extent; but the other soluble salts of copper and zinc are undesirable adulterations to the sulphate of alumina, and all other kindred salts that will perform the action are either much more expensive or much slower in their action.

We do not desire to claim the use of ferro-cyanides alone in this our process for purifying sulphate of alumina or alum-cake, as we are aware that these have heretofore been employed.

We claim as our invention—

1. In the purification of sulphate of alumina, alum, or alum-cake, the process of removing the iron therefrom which consists in adding to the described aluminous solution ferro-cyanide of calcium, or other soluble ferro-cyanide, until the iron in solution is precipitated, and then precipitating the arsenic by a soluble sulphide, and by this means carrying down the suspended ferro-cyanide.

2. In the purification of sulphate of alumina by means of a soluble ferro-cyanide, the process of removing the suspended ferro-cyanide by the addition of sulphate of copper or sulphate of zinc in small quantity.

WILLIAM CHADWICK.
THOMAS CHADWICK.
JAMES CHADWICK.
JOSIAH WICKLIFFE KYNASTON.

Witnesses to the signatures of William Chadwick, Thomas Chadwick, and James Chadwick:

HENRY STEVENSON, Jr.,
*Notary Public, Manchester.*
ORLANDO HAIGH HULME,
*Clerk to the said Henry Stevenson.*

Witnesses to the signature of Josiah Wickliffe Kynaston:

H. S. OPPENHEIM,
*Commissioner, &c.*
JAMES MACKIN,
*Clerk to the said Henry Samuel Oppenheim.*
JAMES W. ALSOP,
*Notary Public, Liverpool.*